(No Model.)
W. SCHULTZ.
APPARATUS FOR OPENING AND CLOSING GATES.
No. 313,688. Patented Mar. 10, 1885.
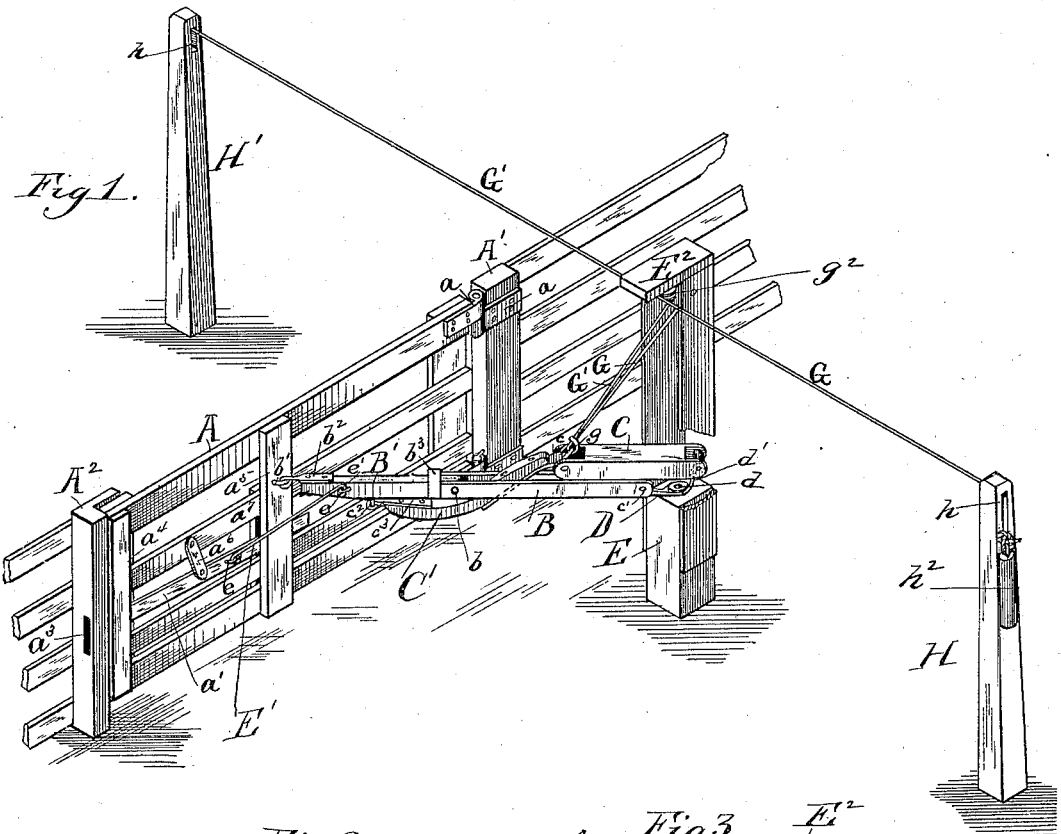
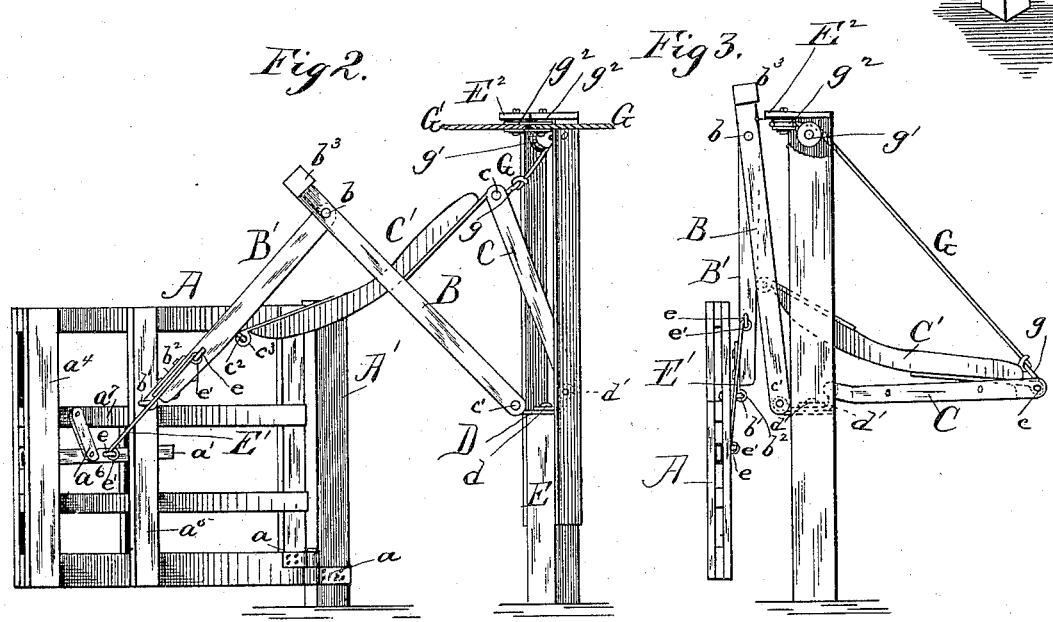
Witnesses:
Lewis E. Curtis.
Taylor E. Brown
Inventor:
William Schultz,
By Munday, Evarts and Adcock
his Attorneys.

UNITED STATES PATENT OFFICE.

WILLIAM SCHULTZ, OF LA PORTE, INDIANA.

APPARATUS FOR OPENING AND CLOSING GATES.

SPECIFICATION forming part of Letters Patent No. 313,688, dated March 10, 1885.

Application filed April 26, 1884. (No model.)

*To all whom it may concern:*

Be it known that I, WILLIAM SCHULTZ, a citizen of the United States, residing in La Porte, in the county of La Porte and State of Indiana, have invented a new and useful Improvement in Apparatus for Opening and Closing Gates, of which the following is a specification.

The object of this invention is to provide a simple and efficient device for automatically opening, closing, and latching gates, which may be operated without dismounting from the horse or vehicle; and to this end my invention consists in an ordinary swinging gate provided with a suitable latch, in connection with my double knee-jointed lever and a flexible rope, cord, or wire to operate the same, whereby the gate is automatically unlatched, swung open, closed, and latched.

The invention also consists in the novel devices and novel combinations of devices herein shown and described.

In the accompanying drawings, which form a part of this specification, Figure 1 is a perspective view of a device embodying my invention. Fig. 2 is a side elevation of the double knee-joint compound lever, showing the gate partially open; and Fig. 3 is a similar view showing the gate open.

In said drawings, A represents the gate, which is hinged in any suitable manner—as, for example, by strap-hinges $a$—to the gate-post A'.

$A^2$ represents the other gate-post, to which the free end of the gate is secured by a suitable latch consisting, preferably, of a sliding bar or bolt, $a'$, which fits in a suitable mortise, $a^3$, in the gate-post, and is confined between the vertical gate-bars $a^4$ near the end of the gate, and the vertical bars $a^5$, near the middle of the gate at the other end. This latch, bolt, or bar $a'$ is suspended near its middle by a pivoted strap, $a^6$, one end of which is pivoted to the bar $a'$ and the other end to the slat $a^7$ of the gate above. When the gate is closed and latched, the normal position of this link or strap $a^6$ is somewhat inclined from the vertical, so that any lifting force acting on the end of the latch-bar $a'$ will tend also to withdraw said latch-bar, and thus unlatch the gate.

My double knee-jointed lever consists of four lever-arms, B B' and C C'. The arms B and B' are hinged or pivoted together at their ends by a pin, $b$, and the arm B is hinged or pivoted at its other end to an arm or plate, D, pivoted on top of the post E by a pin, $d$, so that said plate may swivel or turn horizontally on the top of said post as the gate swings open or shut. The arm B' is secured at its outer end to the gate, preferably to the middle upright bar, $a^5$, and at a point above the latch-bar $a'$.

The means of securing or pivoting the end of the arm B' to the gate may consist of an ordinary staple, $b'$, secured to the gate, and an eye strap, $b^2$, secured to the arm B'. The arm B may preferably consist of a pair of strips or boards, one fitting on each side of the arm B', to which they are hinged or pivoted near their end; and this arm B is provided at its end with a cross-brace, $b^3$, extending between this pair of straps or boards composing the arm B, which cross-brace serves not only to secure the strips B B together, but also as a stop to limit the pivotal movement of the arms B B' on their pivot or knee-joint $b$. The location of the hinge or pivot $b$ in relation to the stop or cross-brace $b^3$ and the hinged arms B B' is such that when the gate is closed these arms will shut down a little past a straight line, so that they will brace the gate shut and tend to keep it closed, even if the same were not latched. If the middle pivot, $b$, of the arms B B' is a little below a straight line drawn between the two pivots at the other ends of said arms, when the same are shut down, as shown in Fig. 1, it is obvious that any opening or pushing of the gate against said arms will not in any way tend to lift the arms, but rather tend to hold them in the position shown in Fig. 5. The gate will, therefore, be held closed by the arms themselves, which will effectually resist any opening tendency, and, in order to open the gate, the levers must be raised at their middle pivot, $b$. The lever-arms C and C' are hinged together at their contiguous ends by a pivot or pin, $c$, and the arm C is hinged at its other end to the pivoted plate or bar D, the end of which is turned up, as shown at $d'$, so that the lever-arm C may lie flat upon the arm B when the gate is closed.

$c'$ represents the pin or pivot, by which the arm B is hinged or pivoted to the plate D. The lever-arm C' is preferably made of a bent form, so that it may extend down between the pair of strips of the arm B and have its under portion extend about parallel to the arm B', to which its end is hinged or pivoted near the middle of said arm B' on the under side thereof.

The means of hinging the end of the arm C' to the arm B' may, preferably, consist of a staple, $c^2$, secured to the arm B', and an eye-strap, $c^3$, secured in any suitable manner to the end of the arm C'.

E' represents a link or rod connecting the latch-bar $a'$ to the jointed arm B'. This connecting-rod may, preferably, be secured both to the latch-bar $a'$ and the arm B' by staples $e$, which pass through eyes $e'$ in said rod. This rod should be attached to the arm B' some little distance from the end of said arm, so that when the knee-pivot or hinge $b$ of said arm is elevated in opening the gate the connecting-rod E' will at the same time tend to lift or raise the latch-bar, and thus withdraw the same through the action of the link or strap $a^6$.

G and G' are the cords, ropes, wires, or other flexible connections by which the double knee-joint levers are operated, one for each side of the fence or gate. The cords G G' are attached to the jointed arms C C', preferably near their pivot, by means of a clevis, $g$, and these cords pass each over a pulley, $g'$, mounted on a horizontal axis, and thence around a pulley, $g^2$, mounted on a vertical axis, both of these pulleys being mounted on an extension, $E^2$, of the post E, so as to give the requisite height to the pulleys.

H and H' are posts, one on each side of the fence, preferably on a line with the gate-post to which the gate is hinged, and each of these posts should be provided with a pulley, $h$, at its top for the cords G and G'.

$h^2$ $h^2$ are weighted handles on the ends of the cords, to keep the same in position.

The operation of my invention is as follows: The operator, by pulling on the cords G G', according to the side from which he approaches the gate, raises the knee-joint of the pivoted arms C C', which at the same time raises the knee-joint of the pivoted arms B B', thus causing the rod E' to withdraw the latch-bar $a'$, and at the same time swing the gate open on its hinges, the double knee-jointed levers operating to pull the gate toward the post E as their knee-joints or pivots are raised by means of the cord. The cord will operate to pull the gate open about half-way—that is to say, until the arm C reaches the vertical position—and then the momentum of the swinging gate will cause the levers to pass the balanced or dead point when the weight of the levers, in conjunction also with the momentum of the gate, will cause the same to swing entirely open, as shown in Fig. 3.

By reference to Fig. 3 it will readily be seen that the weight of the pivoted arms C C' will operate to pull the gate open after the arm C passes the vertical position as well as to hold the same in that position after it is once open.

To close the gate the operator pulls on the other cord, which, as will be seen by reference to Fig. 3, will operate to lift the arms C C' to the vertical position, and thus close the gate about half-way, when the momentum of the swinging gate acts as before to close the same in conjunction with the weight of the levers, because, as will be seen by reference to Fig. 2, the weight of the levers also assists in closing the gate after it swings past the balanced or dead point, and as the levers straighten out the connecting-rod E' will close the latch-bar.

Having thus described my invention, what I desire to secure by Letters Patent is—

1. The combination of a hinged or swinging gate with a double knee-jointed lever consisting of the arms B B', pivoted together at their ends, and the arms C C', pivoted together at their ends, said arm C' having its other end pivoted to the arm B', the arms B and C having their other ends pivoted to a plate, D, substantially as specified.

2. The combination of the hinged gate A with a double knee-jointed lever having one end attached to the gate, and the other to the post for opening and closing said gate, said double knee-jointed lever consisting of arms B B', hinged together at one end, and arms C C', hinged together at one end, said arm C' having also one end hinged to arm B', and a latch bolt or bar connected by a rod, E', to the double knee-jointed lever, so as to withdraw the latch-bar when the gate is opened, substantially as specified.

3. The combination, with the gate A, provided with latch-bar $a'$, connected to said gate by a pivoted link or strap, $a^6$, of the double knee-jointed lever consisting of the arms B B', pivoted together at their ends, and the arms C C', pivoted together at their ends, said arm C' having its other end pivoted to the arm B', the arms B and C having their other ends pivoted to a plate, D, and cords G and G', for operating said lever, substantially as specified.

4. The combination, with the gate A, of the pivoted arms B B', adapted to shut down past the straight line to hold the gate closed, and the pivoted arms C C', connected to said arms B B', and a cord for operating the same to open and close the gate, substantially as specified.

WILLIAM SCHULTZ.

Witnesses:
LEROY D. WEBBER,
GEO. M. MILLER.